US009026258B2

(12) United States Patent
Stapelfeldt

(10) Patent No.: US 9,026,258 B2
(45) Date of Patent: May 5, 2015

(54) METHOD FOR CONTROLLING A WIND FARM

(75) Inventor: Karl Friedrich Stapelfeldt, Lubeck (DE)

(73) Assignee: DeWind Co., Irving, TX (US)

( * ) Notice: Subject to any disclaimer, the term of this patent is extended or adjusted under 35 U.S.C. 154(b) by 903 days.

(21) Appl. No.: 13/060,429

(22) PCT Filed: Aug. 21, 2009

(86) PCT No.: PCT/EP2009/006077
§ 371 (c)(1),
(2), (4) Date: Sep. 13, 2011

(87) PCT Pub. No.: WO2010/025836
PCT Pub. Date: Mar. 11, 2010

(65) Prior Publication Data
US 2012/0010755 A1     Jan. 12, 2012

(30) Foreign Application Priority Data

Aug. 23, 2008   (DE) .................. 10 2008 039 429

(51) Int. Cl.
*H02J 3/46*      (2006.01)
*F03D 7/02*      (2006.01)
(Continued)

(52) U.S. Cl.
CPC ................ *H02J 3/46* (2013.01); *F03D 7/0284* (2013.01); *F03D 7/047* (2013.01); *F03D 7/048* (2013.01);
(Continued)

(58) Field of Classification Search
CPC ..... F03D 7/047; H02J 3/386; F05B 2270/337
USPC ......................................................... 700/287
See application file for complete search history.

(56) References Cited

U.S. PATENT DOCUMENTS 7,013,203 B2 *   3/2006   Moore et al. ................. 700/286
2002/0029097 A1   3/2002   Pionzio et al.
(Continued)

FOREIGN PATENT DOCUMENTS

DE     10231797     1/2004
DE     60311271     8/2007
(Continued)

OTHER PUBLICATIONS

Moxa Corporation, "Wind farm system excels at remote monitoring and control", (published and publicly available online as of Aug. 24, 2008). website accessed Nov. 25, 2013: http://www.moxa.com/applications/success_stories_Wind_Farm_System_Excels_at_Remote_Monitoring_and_Control.htm.*
(Continued)

*Primary Examiner* — Robert Fennema
*Assistant Examiner* — Fenyang Stewart
(74) *Attorney, Agent, or Firm* — Sheppard, Mullin, Richter & Hampton LLP

(57) ABSTRACT

In order to specify a method for the regulation of a wind park (1) comprised of a multiplicity of wind energy installations (WT1, ..., WT9), wherein the wind park (1) is connected to an electric utility grid (12) into which the electric power generated by the wind park (1) is fed, and the wind park (1) includes a control input (13) by means of which nominal controlled variables (15, 16) of the wind park (1) can be set, which can be adapted to highly different wind park topologies using the least possible adaptation expenditures, which permits the addition or removal of wind energy installations to or from the wind park with minimal adaptation expenditures, which is utilizable without a measurement of the park network data at the grid transfer point and which, moreover, allows the integration of wind energy installations by different manufacturers into a wind park, it is proposed that each wind energy installation (WT1, ..., WT9) is regulated decentralized in order to maintain at least one nominal controlled variable (15, 16) of the wind park (1), wherein as a function of the nominal controlled variable (15, 16) for the wind park (1) at least one controlled input variable (P1ref, Q1ref) for the wind energy installation (WT1, ..., WT9) is calculated.

27 Claims, 2 Drawing Sheets

Figure 1:
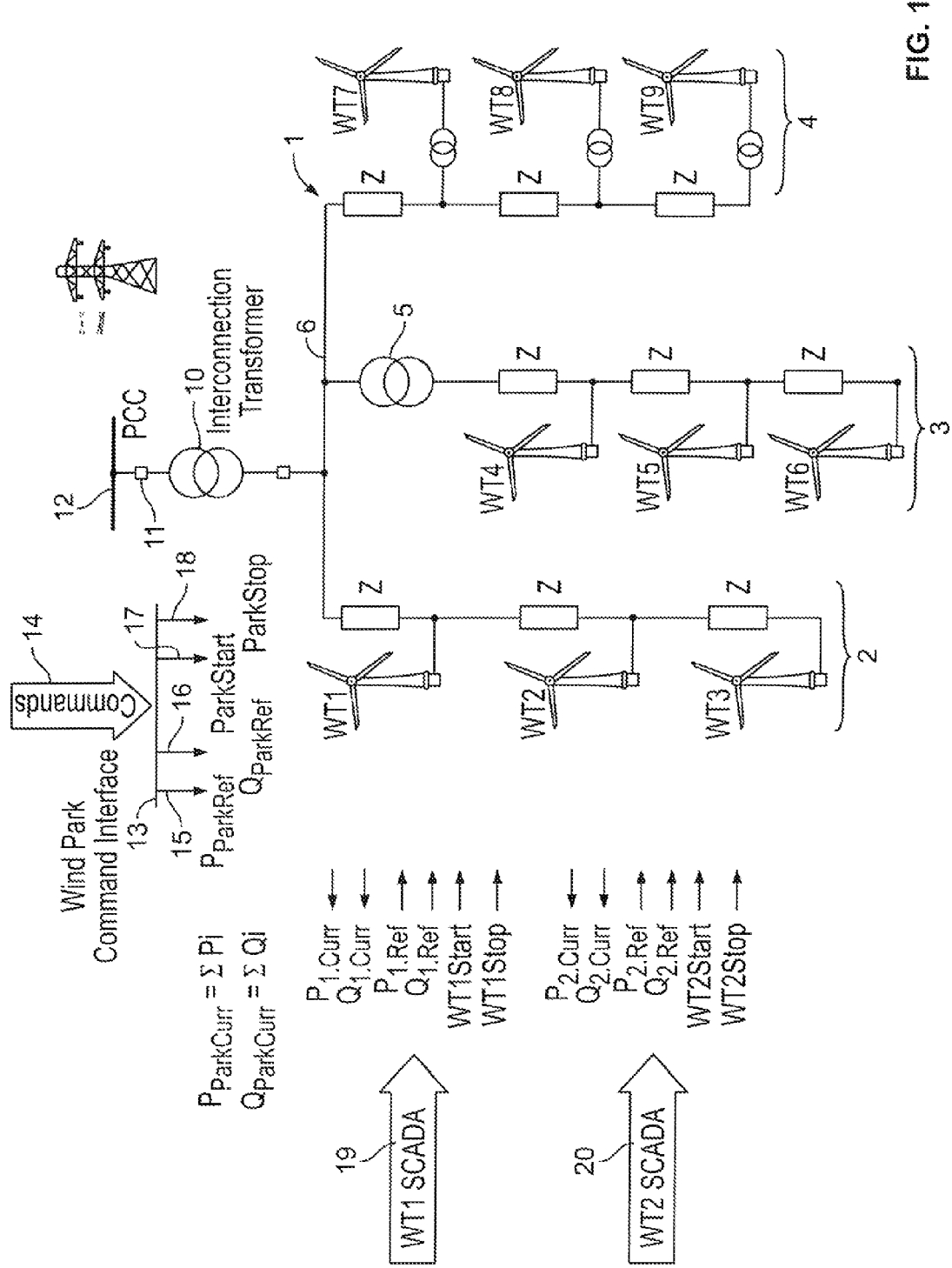

(51) Int. Cl.
*F03D 7/04* (2006.01)
*H02J 13/00* (2006.01)
*H02J 3/38* (2006.01)

(52) U.S. Cl.
CPC ....... *F05B 2240/96* (2013.01); *F05B 2270/337* (2013.01); *H02J 13/0062* (2013.01); *Y02E 10/723* (2013.01); *Y02E 10/763* (2013.01); *Y04S 10/123* (2013.01); *Y04S 40/124* (2013.01); *Y02E 60/7838* (2013.01); *H02J 3/386* (2013.01)

(56) References Cited

U.S. PATENT DOCUMENTS

| | | |
|---|---|---|
| 2003/0195934 A1 | 10/2003 | Peterson et al. |
| 2005/0080799 A1 | 4/2005 | Harnden et al. |
| 2007/0063866 A1 | 3/2007 | Webb |
| 2008/0073912 A1* | 3/2008 | Fortmann et al. ............... 290/44 |
| 2008/0133051 A1 | 6/2008 | Wallace et al. |
| 2009/0187282 A1* | 7/2009 | Menke et al. ................ 700/287 |
| 2010/0274399 A1* | 10/2010 | Sadaba et al. ................ 700/287 |

FOREIGN PATENT DOCUMENTS

| | | |
|---|---|---|
| EP | 519040 | 3/2005 |
| EP | 1528447 | 5/2005 |
| EP | 1906353 | 2/2008 |
| WO | WO 02/079646 | 10/2002 |
| WO | WO 2005/045713 | 5/2005 |
| WO | WO 2009/033246 | 3/2009 |

OTHER PUBLICATIONS

Moxa. "Wind farm system excels at remote monitoring and control". Apr. 24, 2008. Global System Provider for Windmill Systems Europe. http://www.moxa.com/applications/success_stories_Wind_Farm_System_Excels_at_Remote_Monitoring_and_Control.htm.*

* cited by examiner

METHOD FOR CONTROLLING A WIND FARM

The present invention relates to a method for regulating a wind park comprised of a multiplicity of wind energy installations, wherein the wind park is connected to an electric utility grid, into which the electric power generated by the wind park is fed, and the wind park has available a control input by means of which the nominal controlled variables of the wind park can be set.

The present invention, in addition, relates to a control for a wind energy installation in a wind park for carrying out a method of the above described type.

Wind energy installations are frequently not set up singly in isolation, but rather are installed as wind parks in the form of a multiplicity of wind energy installations set up close to one another. By wind park is thus understood in this context a configuration of at least two wind energy installations. Frequently more than 50 wind installations are set up interconnected as a group in a combination. The wind parks of said type feed as a unit at a grid transfer point (PCC/Point of Common Coupling) electric power into the interconnected power grid. On the part of the power grid operator there are specific requirements with respect to the feed-in, which requirements serve as nominal controlled variables of the wind park. Among the requirements are in particular specific values of the active power, the reactive power and of the mains voltage.

To maintain these specifications of the power grid operator, the coordinated behavior of the individual wind energy installations of the wind park is a necessity. Within prior art, wind park regulations and management systems are utilized for this purpose, which are based on a central wind park computer. The central wind park regulator communicates according to prior art via a wind park network with the turbines in the wind park and comprises a command interface to the power grid operator. According to prior art, each wind energy installation, which is a part of the wind park, is centrally controlled by the wind park computer. The central wind park computer within prior art calculates for this purpose for each individual wind energy installation under consideration nominal values of the available wind, the turbine availability and the nominal value specifications of the power grid operator. Depending on the need, the individual wind energy installations of the wind park are within prior art started and stopped sequentially by the central park computer.

Wind parks with a central control architecture of said type are described, for example, in EP 1 519 040 A 1, US 2002/0029097, WO 00 2007 147 521 A1 or WO 03/030329 A1.

The currently conventional central control, however, has the disadvantage that an expansion of the wind park by adding additional wind energy installations frequently entails complicated software adaptations and correspondingly additional projection expenditure. There is, furthermore, potentially the risk that the entire wind park is not usable if a fault is present in the central wind park control. Further, adaptation of the central control to different topologies of the wind park is only possible, as a rule, using complicated adaptations of the software. Problematic is also the integration of wind energy installations by different manufacturers into the wind park. Of disadvantage in the known central wind park regulations, in addition, is that a measurement of the park network data is required for the regulation.

The present invention therefore addresses the problem of specifying a method for the regulation of a wind park of the type described in the introduction, which, with the least possible adaptation expenditure, can be adapted to different wind park topologies, which permits the addition or removal of wind energy installations to or from the wind park with minimal adaptation expenditure, which can be utilized without a measurement of the park network data at the grid transfer point and, moreover, allows the integration of wind energy installations by different manufacturers into a wind park.

A further problem addressed by the invention is specifying a control for a wind energy installation in a wind park for carrying out said method in order to overcome said disadvantages.

According to the invention the method objective is solved with a method of the type stated in the introduction thereby that each wind energy installation is regulated as decentralized in order to maintain at least one nominal controlled variable of the wind park, wherein, as a function of the nominal controlled variable for the wind park in each instance at least one controlled input variable for the wind energy installation is calculated. Each wind energy installation of the wind park consequently comprises an independent control which as an input variable processes the nominal controlled variable for the wind park in order to determine in this way the controlled input variable for this wind energy installation. The wind park behaves in this manner without a central control quasi like a self-regulating system.

In embodiment of the invention the nominal controlled variable for the wind park is an active power specification and/or a reactive power specification and/or a mains voltage specification and/or a power factor of the wind park (1) and/or an output frequency of the wind park and/or a parameter for the characterization of a time course of at least one nominal controlled variable of the wind park. With the last listed parameter, with advantage, in particular a time course of the power, voltage, frequency and/or of the voltage can be specified as park output variables.

The method according to the invention is further improved if the calculation of the controlled input variable is additionally carried out as a function of at least one local measured variable, preferably a local wind speed. With the method according to the invention through the local control of every individual wind energy installation of the wind park, taking into consideration the nominal controlled variable of the superordinate wind park as well as also of local measured data, a local controlled input variable in this way can be determined for the wind energy installation. The contribution of the individual wind energy installation to the power of the entire wind park is consequently determined locally.

The method according to the invention is further improved thereby that additionally at least one status variable and/or local measured variable, in particular rotational speed, of another wind energy installation of the wind park is polled and the calculation of the controlled input variable is carried out additionally as a function of this status variable. Through this measure, to each individual wind energy installation control the complete information of the entire wind park is available. The regulation to attain the nominal values specified by the power grid operator therefore proves to be especially favorable.

Based on the knowledge of the status information of the wind park, every wind power plant can trigger a coordinated start and stop of the wind energy installations in the wind park.

The status variable of the other wind energy installation preferably includes its availability and/or its power and/or its rotational speed.

The complete networking of the individual wind energy installations and consequently a further optimization of the method according to the invention provides that additionally at least one status variable of every other wind energy installation of the wind park is polled and the calculation of the controlled input variable is carried out additionally as a function of this status variable.

In further development of the method according to the invention each wind energy installation can be regulated-in to an active power as decentralized, preferably by adjusting the rotor blade angle. The active power of each wind energy installation is therein calculated according to the invention in conjunction with the nominal controlled variable of the wind park and possibly of local measured variables as well as status variables of other wind energy installations of the wind park.

In embodiment of the method according to the invention each wind energy installation is regulated-in as decentralized to a power factor and/or a reactive power and/or a voltage. Again, the nominal controlled values for the wind energy installation are calculated as a function of the nominal controlled variables of the wind park and possibly of local measured variables as well as status variables of other wind energy installations of the wind park.

In terms of the invention, it is especially advantageous if the at least one status variable and/or local measured variable of one/of the other wind energy installation(s) of the wind park is periodically polled under decentralization. The periodic polling thus does not take place, as is the case in prior art, via a central management system. Rather, each wind energy installation requests as a decentralized installation the appropriate data. In this way it is ensured that the control of the individual wind energy installation can be based on current data about the other wind energy installations of the wind park.

Preferably in a further advantageous embodiment each wind energy installation can send changes of its own data to the other wind energy installations of the wind park. This can either take place in the form of a multicast in parallel to all other wind energy installations of the wind park or in the form of a unicast sequentially to each individual wind energy installation. Thus all wind energy installations of the park communicate cyclically among each other across a park network. Suitable data transmission mechanisms ensure the reconciliation among each other of the park nominal values, of the park parameters as well as of the status information of the wind energy installations in the park. Through this measure the complete information of the entire wind park is available to every individual wind energy installation control. The polling should take place in intervals as short as possible. Ideally, continuous data polling takes place. A park network for the realization of this function should therefore have as high a bandwidth as possible. For example, depending on the type of installation, a clock rate of 100 ms can be suitable.

In advantageous embodiment of the method according to the invention, as a function of the calculated controlled input variable for the wind energy installation a message for varying at least one operating parameter, in particular rotor blade pitch angle of at least one other wind energy installation of the wind park, is sent as a decentralized message to the other wind energy installation(s). This can be of advantage, for example, if by one wind energy installation locally a wind gust is detected in order to vary the rotor blade angle before arrival of this gust at another wind energy installation of the park to avoid damage. In this way, according to the invention a pre-control for the blade angle adjustment in terms of an observer function is provided. In conventional regulations based on a central park server this function can be realized by means of the central park server. Thereby that according to the invention this function takes place at the level of the wind energy installation, a central computer can advantageously be omitted. Each individual wind energy installation of the wind park is according to the invention in the position of triggering a shut-off of individual or of all wind energy installations of the wind park.

Moreover, according to the invention each wind energy installation, just like the data interface at the PCC, can receive a ParkStart or a ParkStop command. These commands are distributed over the wind park network and appropriate data reconciliation mechanisms and subsequently lead to the independent coordinated park shut-off. However, it holds true that every installation acts independently based on the information available to it. In the case of a coordinated park shut-off, each turbine, for example, waits for the successful shut-off of the preceding turbine in order to initiate subsequently the shut-off process on its part.

In further advantageous embodiment of the invention at least one park current value can be measured, wherein the calculation of the controlled input variable is additionally carried out as a function of the measured park current value. The park current value is usefully read in by each turbine at the grid transfer point (PCC), in order to fine-adjust therewith the locally determined nominal controlled value of the particular wind energy installation.

For further improvement of the regulation quality, within the scope of the invention the calculation of the controlled input variable is additionally carried out as a function of at least one neighboring turbine property, in particular of a line length. For example, the proportion to the reactive power statics and to the compensation of the losses can be individually calculated and be utilized for the pre-control of the particular local wind energy installation regulation.

In a preferred embodiment of the invention nominal controlled variables of the wind park can be transmitted by means of a decentralized control and data recording unit (SCADA unit) [Supervisory Control And Data Acquisition] and/or by means of a data network to the wind energy installations. In the same manner, regulation modes as well as ParkStart and ParkStop commands can be transmitted.

Alternatively to the transmission across the SCADA system, said data can be read in by every wind energy installation via an analog and/or digital interface at the interface to the power grid operator.

The arrangement problem cited above is solved according to the invention in a control for a wind energy installation in a wind park for carrying out the above described method in that means are provided for the direct communication with other wind energy installations within the wind park and/or means for communication with the control input of the wind park, a data area for storing at least one nominal controlled variable of the wind park and/or at least one status variable of at least one other wind energy installation as well as means for calculating a controlled input variable for the wind energy installation as a function of the nominal controlled variable for the wind park and/or of the status variable. By direct communication is to be understood here that the communication takes place directly from one wind energy installation to the other without engaging a central computer.

Within the scope of the invention the means for communication with other wind energy installations comprises preferably a data network, in particular the Internet, and/or a router.

In order to communicate variable parameters of the wind park, which are specified by the power grid operator, such as for example park nominal values and park regulation modes as well as ParkStart and ParkStop commands to the controls of the individual wind energy installations, the means for communication with the control input of the wind park comprises a data interface. This data interface, integrated into the wind park network, can be part of the data reconciliation mechanism of the wind energy installations with one another.

The invention will be described by example in a preferred embodiment with reference to a drawing, wherein further advantageous details can be found in the figures of the drawing.

Functionally identical parts are here provided with the same reference symbols.

Figure 2:
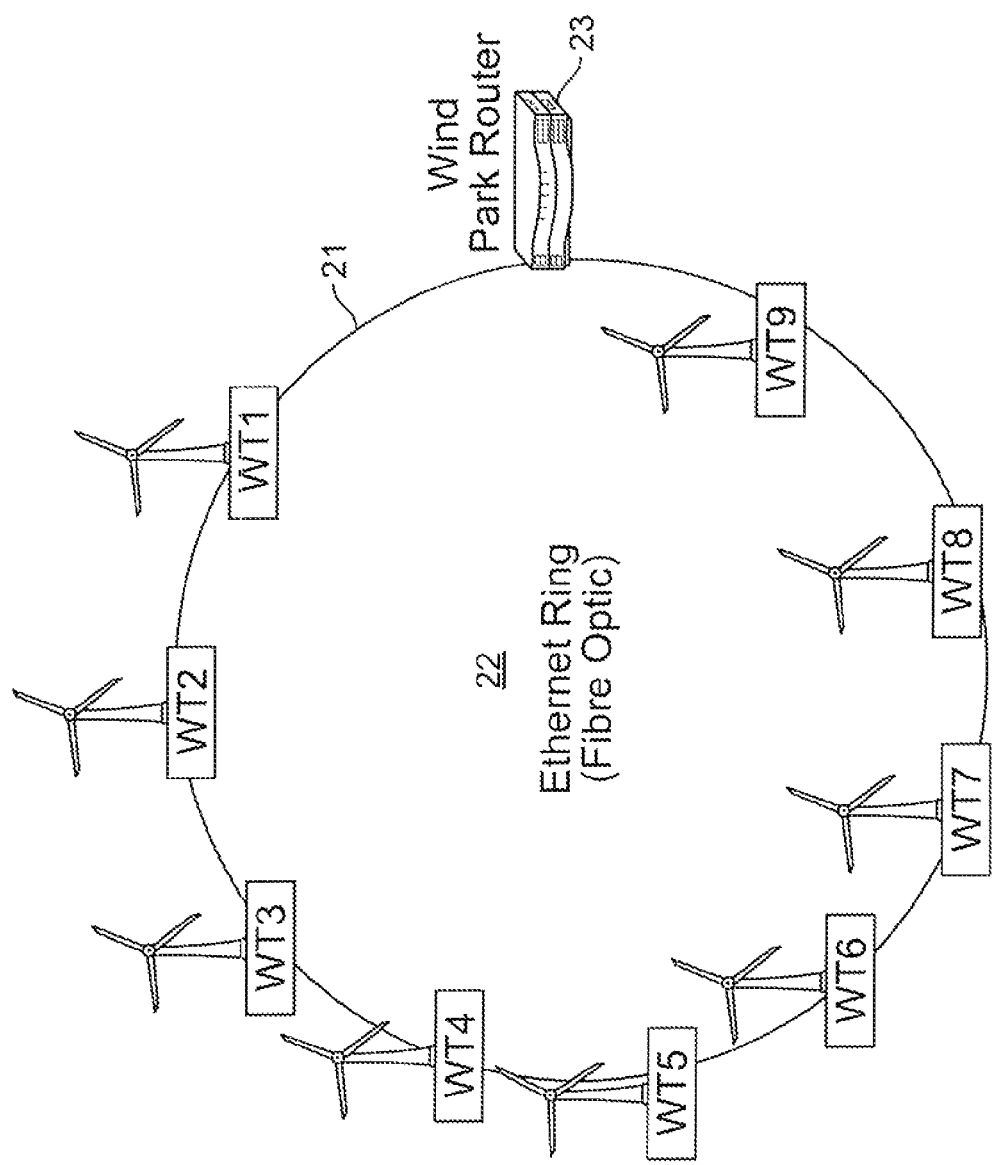

The figures of the drawing depict in detail:

FIG. 1: the schematic structure of an exemplary wind park, which can be regulated with the method according to the invention, as well as its linkage and interface to a power grid, FIG. 2: a schematic depiction of a park network for the communication among the wind energy installations of the wind park according to FIG. 1 when applying the method according to the invention.

FIG. 1 shows a wind park 1 comprised of a multiplicity of interconnected wind energy installations WT1, ..., WT9 for the formation of the wind park 1. The topology of the wind park 1 depicted by example is comprised of three branches 2, 3, 4. Branch 2 combines electrically the wind energy installations WT1, WT2 as well as WT3. The interconnection is illustrated by the impedances Z. Branch 2 is directly connected to the park transfer line 6.

Branch 3 of wind park 1 is comprised of wind energy installations WT4, WT5 as well as WT6, which are electrically interconnected. The interconnection of the wind energy installations WT4, WT5, WT6 is again indicated by the impedance Z. Branch 3 is connected with branch 2 to a park transfer line 6 across an intermediate transformer 5.

Branch 4 combines the wind energy installations WT7, WT8, WT9. The interconnection in the case of branch 4 is realized with interspaced transformers 7, 8, 9, wherein in addition, again, the impedances Z are shown schematically. Branch 4 is connected directly to the park transfer line 6. The park transfer line 6 is connected to a grid transfer point (PCC=Point of Common Coupling) 11 across a transfer transformer 10.

The PCC 11 is electrically connected to the external power grid 12. The wind park 1 described by example, consequently, is comprised of the branches 2, 3, 4 electrically interconnected in different ways.

In FIG. 1 is further indicated schematically a control interface 13 between a power grid operator and the wind park 1. Across the control interface 13 control commands 14 are transferred to the wind park 1. The control commands 14 are interpreted on the side of the wind park 1 as an active power nominal value (PPark, Ref) IS as well as a reactive power nominal value (QPark, Ref) 16. The control commands 14, which are transferred from the operator of the power grid 12 to the wind park 1, contain further a ParkStart command 17 for the coordinated start of the wind park 1 as well as a ParkStop command 18 for the coordinated shut-down of the entire wind park 1.

At the grid transfer point 11, the current value of the active power of the wind park 1, (PPark, Ref) is obtained as the calculated summation of the partial active powers Pi of each wind energy installation WT1, WT9. This is indicated schematically in the Figure by the summation formula PPark. Ref=G Pi.

In the same manner at the grid transfer point 11 the current value of the park reactive power (QPark, Ref) is obtained as the calculated summation of the partial reactive powers of each wind energy installation WT1, ..., WT9. This is also indicated in the Figure by the summation formula Q Park, Ref=G Qi.

The communication with the wind energy installations WT1, ..., WT9 is illustrated in the Figure by example for the wind energy installation WT2. Accordingly, variable park parameters of the grid operator, such as in particular park nominal values and park regulation modes are transmitted across a decentralized control and data recording unit (SCADA unit) 19, 20 of the particular wind energy installation WT1 or WT2 to these. Data, which are output by a local control of each wind energy installation WT1, ..., WT9, comprise, as outlined in FIG. 1, in particular a current value of a partial active power P1Curr of the wind energy installation 1 as well as a current value of the partial reactive power Q1Curr of the wind energy installation WT1. Further, as indicated by the opposite arrow direction, the local control of each wind energy installation WT1, ..., WT9 generates a signal for the nominal value of the partial active power P1, Ref of the particular wind energy installation WT1, a nominal value of the reactive power Q 1, Ref as well as, optionally, a start command WT1Start and a Stop command WT1Stop for starting or shutting off the particular wind energy installation WT1, ..., WT9. The conditions are illustrated analogously for WT2 with changed indices.

In FIG. 2 is outlined a wind park network 21, which allows the wind energy installations WT1, ..., WT9 of wind park 1 according to FIG. 1 to communicate with one another. The wind park network 21 is embodied as an Ethernet ring 22 which comprises a network router 23. The Ethernet ring 22 can, for example, be implemented as an optical fiber, cable, copper cable or also wirelessly as a Wi-Fi network (WLAN).

The Ethernet ring 22 makes available in connection with the network router 22 the data communication between each wind energy installation WT1, WT9 of the wind park 1 with all other wind energy installations WT1, ..., WT9. The configuration as a circle in FIG. 2 is to be understood only schematically and should not be misinterpreted in the sense that only a sequential communication between neighboring wind energy installations is possible.

The method according to the invention is carried out in a wind park 1 with the wind energy installations WT1, ..., WT9, which are networked with one another via the wind park network 21, as follows.

The grid operator sends control commands 14 to the wind park 1. The control commands 14 contain nominal values for the active power 15 and the reactive power 16, which the wind park 1 is to feed across the transfer transformer 10 at the grid transfer point 11 into the power grid 12. The control command 14 contains further the ParkStart command 17 to power up the wind park 1. The active power nominal value 15, the reactive power nominal value 16 as well as the ParkStart command 17 are subsequently transferred across the SCADA units 19, 20, etc., which are assigned to each wind energy installation WT [1], ..., WT9, to the local controls of each wind energy installation WT1, ..., WT9. Each local control of each wind energy installation WT1 ... WT9 subsequently determines a local measuring variable such as, for example, the wind speed at the location of the particular wind energy installation WT1 ... WT9. The local control of each wind energy installation WT1 ... WT9, further, obtains across the wind park network 21 by means of the Ethernet ring 22 data about the operating status of one, several or all other wind energy installations of the wind park 1. The status data of the other wind energy installations relate in particular to the current active power as well as the current active power and reactive power of the other wind energy installation(s).

Subsequently, through the local control of each wind energy installation a local nominal value is calculated based on the nominal values for the wind park obtained from the external control command 14, based on the local measured values, such as for example the wind speed, as well as based on the status data of the other wind energy installations. The local nominal values serve for the control of the particular wind energy installation.

Within the wind park network 21 a unique logic address is assigned to each wind energy installation, via which address it can be addressed by the other wind energy installations. All wind energy installations now communicate cyclically with one another across the wind park network 21. The cyclic data transmission between the wind energy installations ensures the reconciliation of the parameters and of the status information oldie wind energy installations in the wind park 1.

Taking into consideration the availability of the other wind energy installations WT1 . . . WT9 in wind park 1 as well as further information, such as for example local wind speed, and park nominal controlled variables, each wind energy installation control now calculates cyclically the locally acting nominal value in order to meet the specifications of the grid operator for the wind park 1 at the grid transfer point 11.

The resulting park current value at grid transfer point 11 can be calculated by superposition of the active and reactive powers of each individual wind energy installation WT1 WT9 of wind park 1. Therefore, advantageously and according to the invention, a measurement of these values at the grid transfer point 11 is not absolutely required.

Correspondingly, park topologies with wind energy installations by different manufacturers within the wind park are also realizable. A precondition is only that each wind energy installation comprises an additional data interface for the transfer of the status and command information. Each wind energy installation can subsequently transmit the particular status across the wind park network 21 to the other wind energy installations.

Within the wind park network 21 each wind energy installation is hierarchically coequal. Accordingly, each wind energy installation WT1, WT9 can, as a function of the calculated local nominal values, also send a start or stop command to other wind energy installations of the wind park 1 across the wind park network 21 in order to shut off or power up individual wind energy installations of wind park 1.

The method according to the invention does not require a centrally controlled park computer as a management system for the wind park 1. The regulation to the park nominal values is based according to the invention solely on the locally measured current values of each wind energy installation.

The decentralized wind park regulation according to the invention makes it possible that the park regulation behavior is in principle independent of the number of wind energy installations of the wind park 1. For each individual wind energy installation carries out all of the functions of the park regulation.

Through this decentralized approach the park regulation becomes independent with respect to changes of the park topology and, due to the fast local regulation, is robust with respect to transient processes such as the shut-off of individual wind energy installations and grid faults within and outside.

The independence from the park topology is illustrated in the embodiment example according to FIGS. 1 and 2 in particular thereby that each of the branches 2, 3, 4 of the wind park 1 is electrically differently interconnected, wherein this difference does not play a role in the architecture of the wind park network 21.

LIST OF REFERENCE NUMBERS

1 Wind park
WT1 Wind energy installation
. . .
WT9 Wind energy installation
2 Branch
3 Branch
4 Branch
Z Impedance
5 Intermediate transformer
6 Park transfer line
7 Transformer
8 Transformer
9 Transformer
10 Transfer transformer
11 Grid transfer point
12 Power grid
13 Control interface
14 Control command
15 Active power nominal value
16 Reactive power nominal value
17 Park start command
18 Park stop command
19 SCADA unit
20 SCADA unit
21 Wind park network
22 Ethernet ring
23 Network router

The invention claimed is:

1. A system for the regulation of a wind park that is connected to an electric utility grid into which electric power generated by the wind park is fed, the system comprising:
   a control input for setting nominal controlled variables of the wind park;
   a plurality of interconnected wind energy installations, the wind energy installations each having its own local control system for individual control, the local control system comprising means for calculating at least one controlled input variable for the associated wind energy installation as a function of the nominal controlled variables of the wind park;
   wherein each wind energy installation is regulated as a decentralized installation in order to maintain at least one nominal controlled variable of the wind park.

2. The system of claim 1, wherein the nominal controlled variable for the wind park is one or more selected from the group consisting of: an active power specification, a reactive power specification, a grid voltage specification, a power factor of the wind park, an output frequency of the wind park, and a parameter for the characterization of a time course of at least one nominal controlled variable of the wind park.

3. The system of claim 1, wherein the means for calculating the at least one controlled input variable is additionally carried out as a function of at least one local measured variable selected from the group consisting of: a local wind speed and/or a rotational speed.

4. The system of claim 1, further comprising means for polling at least one status variable, at least one local measured variable, or both and means for calculating the at least one controlled input variable is carried out additionally as a function of the at least one status variable, the at least one local variable or both.

5. The system of claim 4, wherein the status variable of the other wind energy installation comprises its availability, its power, or both.

6. The system of claim 1, further comprising means for polling at least one status variable of each of the other wind energy installations of the wind park and means for calculating the controlled input variable as a function of the status variable.

7. The system of claim 1, further comprising an active power for regulating each wind energy installation by adjusting the rotor blade angle.

8. The system of claim 1, wherein each wind energy installation is regulated decentralized to one or more of a power factor, a reactive power and a voltage.

9. The system of claim 1, further comprising means for periodically polling one or both of at least one status variable and at least one local measured variable of the other ones of the wind energy installation(s) of the wind park.

10. The system of claim 1, further comprising means for transmitting a command to change at least one operating parameter of at least one wind energy installation of the wind park as a function of the calculated controlled input variable for the other one of the wind energy installation.

11. The system of claim 1, further comprising means for measuring at least one park current value and means for calculating the controlled input variable is carried out additionally as a function of the measured park current value.

12. The system of claim 1, wherein the means for calculating the at least one controlled input variable is carried out additionally as a function of at least one neighboring turbine property or a line length.

13. The system of claim 1, further comprising one or both of a decentralized control and data recording unit (SCADA unit) and a data network for transmitting the nominal controlled variables of the wind park to the wind energy installations.

14. A system for decentralized control of wind energy installations in a wind park, each one of the wind energy installations comprising:
    means for providing direct communication with other wind energy installations within the wind park;
    means for providing communication with the control input of the wind park;
    a data storage area for storing one or both of at least one nominal controlled variable of the wind park and at least one status variable of at least one other wind energy installation; and
    means for calculating a controlled input variable for the wind energy installation as a function of one or both of the nominal controlled variable for the wind park and the status variable.

15. The system of claim 14, wherein the means for providing direct communication with other wind energy installations comprise one or a combination of a data network, an Ethernet, and a router.

16. The system of claim 14, wherein the means for providing direct communication comprises a data interface with the control input of the wind park.

17. A method for regulating a wind park having a plurality of decentralized and locally controlled wind energy installations, the method for each one of the plurality of wind energy installations comprising:
    receiving at least one nominal controlled variable of the wind park;
    calculating at least one controlled input variable for the wind energy installation based on the at least one nominal controlled variable for the wind park; and
    controlling the wind energy installation based on the at least one controlled input variable calculated for the wind energy installation.

18. The method of claim 17, wherein the at least one nominal controlled variable for the wind park is one or more selected from the group consisting of: an active power specification, a reactive power specification, a grid voltage specification, a power factor for the wind park, an output frequency of the wind park, and a parameter for the characterization of a time course of the at least one nominal controlled variable of the wind park.

19. The method of claim 1, wherein the at least one controlled input variable is calculated based additionally on at least one local measured variable.

20. The method of claim 19, wherein the at least one local measured variable is one or both of a local wind speed and a rotational speed.

21. The method of claim 19, further comprising polling at least one status variable, at least one local measured variable, or both, of the other ones of the plurality of wind energy installations and calculating the controlled input variable as a function of the at least one status variable, the at least one local variable, or both.

22. The method of claim 21, wherein the at least one status variable is one or more selected from the group consisting of: a rotational speed, availability, and power of the other ones of the plurality of wind energy installations.

23. The method of claim 17, further comprising periodically polling at least one status variable, at least one local measured variable, or both, of the other ones of the plurality of wind energy installations.

24. The method of claim 17, further comprising sending a command to change at least one operating parameter of at least one of the other ones of the wind energy installation based on the at least one controlled input variable calculated for the wind energy installation.

25. The method of claim 24, wherein the at least one operating parameter is a rotor blade pitch angle.

26. The method of claim 17, wherein the calculating is performed based additionally on one or a combination of at least one park current value, at least one neighboring turbine property, and a line length.

27. The method of claim 17, wherein the at least one nominal controlled variable is received via a decentralized control and data recording unit (SCADA unit), a data network, or both, to the wind energy installations.

\* \* \* \* \*